United States Patent [19]

Gartside et al.

[11] 4,390,502
[45] Jun. 28, 1983

[54] SOLIDS FEEDING DEVICE AND SYSTEM

[75] Inventors: Robert J. Gartside, Auburndale, Mass.; Herman N. Woebcke, Stamford, Conn.

[73] Assignee: Stone & Webster Engineering Corporation, Boston, Mass.

[21] Appl. No.: 318,926

[22] Filed: Nov. 6, 1981

Related U.S. Application Data

[63] Continuation of Ser. No. 165,786, Jul. 3, 1981, Pat. No. 4,352,728, which is a continuation-in-part of Ser. No. 89,951, Oct. 22, 1979, Pat. No. 4,338,187.

[51] Int. Cl.³ .............................................. F27B 15/08
[52] U.S. Cl. ................................. 422/145; 208/152; 208/153; 422/219
[58] Field of Search ................ 208/152, 153; 422/145, 422/219

[56] References Cited

U.S. PATENT DOCUMENTS

| 2,327,175 | 8/1943 | Conn | 422/219 X |
|---|---|---|---|
| 2,518,842 | 8/1950 | Weber | 23/284 |
| 2,905,634 | 9/1959 | MacLaren et al. | 208/149 |
| 3,121,593 | 2/1964 | McIlvaine | 302/53 |
| 3,136,705 | 6/1964 | Sommers | 202/14 |
| 3,573,200 | 3/1971 | Vogel | 208/173 |
| 3,733,011 | 5/1973 | Driscoll | 222/193 |
| 3,826,738 | 7/1974 | Zenz | 208/153 |
| 4,061,562 | 12/1977 | McKinney et al. | 208/61 |
| 4,097,362 | 6/1978 | McKinney | 208/78 |

Primary Examiner—Robert L. Lindsay, Jr.
Attorney, Agent, or Firm—Hedman, Casella, Gibson & Costigan

[57] ABSTRACT

The present invention is an apparatus continuously feeding particulate solids to a TRC reaction chamber or zone at a controlled rate of flow, and for admixing the solids with fluid simultaneously introduced to the reaction zone. This invention utilized one or more conduits, preferably tubular, to transfer the solids from a solids reservoir chamber to the reaction chamber at a controlled rate of flow, the conduits being in open communication with both the reservoir chamber and with the reaction chamber. The conduits are in the nature of orifices, and are symmetrically located across the reactor cross section, said orifices or conduits also being specially oriented with respect to the fluid reactant inlet to promote rapid and intimate mixing of the two phases.

9 Claims, 11 Drawing Figures

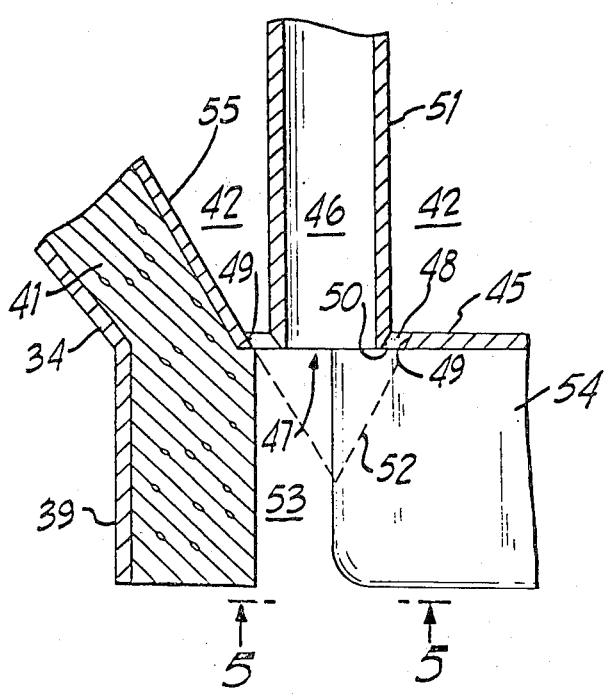
FIG. 2
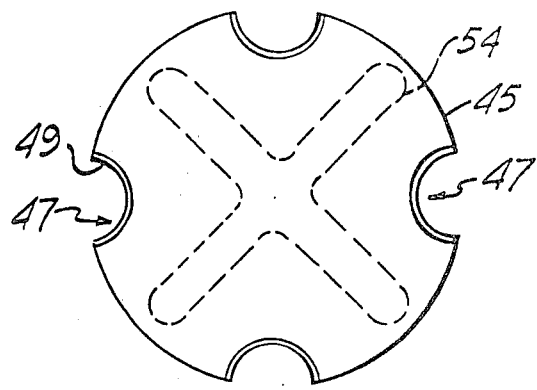
FIG. 3
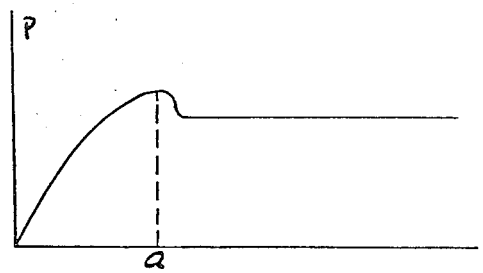
FIG. 4
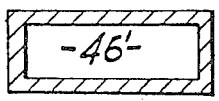
FIG. 6
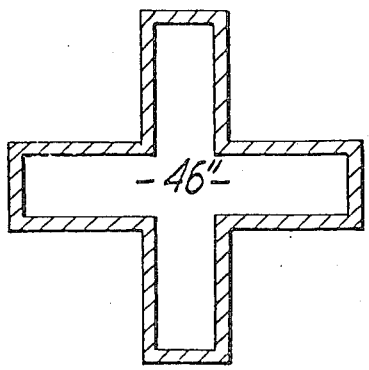
FIG. 7
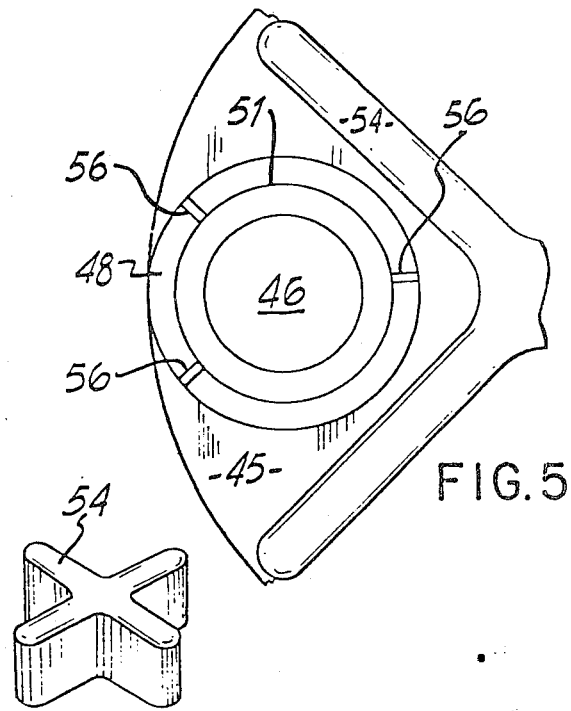
FIG. 5
FIG. 8

SOLIDS FEEDING DEVICE AND SYSTEM

CROSS REFERENCE TO RELATED APPLICATION

This is a continuation of application Ser. No. 165,786 filed July 3, 1981, now U.S. Pat. No. 4,352,728, granted Oct. 5, 1982, which in turn is a continuation-in-part of application Ser. No. 089,951 filed Oct. 22, 1979, now U.S. Pat. No. 4,338,187, granted July 6, 1982.

BACKGROUND OF THE INVENTION

1. Field of the Invention

The invention relates to both the delivery of particulate solids to a reaction chamber and to internally mixing the particulate solids and fluid, principally feed, at the reactor, and is particularly well adapted in an apparatus and process for use in the Thermal Regenerative Cracking (TRC) process, as described in U.S. Pat. No. 4,061,562 to McKinney et al and U.S. Pat. No. 4,097,363 to McKinney et al.

2. Description of The Prior Art

Particulate solids are used in gas phase or liquid phase reactions for a variety of reasons. Typically, the particulate solids are present to catalytically accelerate (or rarely, decelerate) the rate of reaction. In still other reaction systems, solids are admixed and reacted with the fluid reactants. During the course of the reaction the solids participate in the reaction as a reactant and are depleted. Another use of particulate solids is to supply heat for the reaction. Hot inert solids are added to the reaction zone simultaneously with the gaseous reactants, the heat being transferred to the fluid medium by direct heat transfer. Conversely, the particulate solids may occasionally be employed to remove heat of reaction.

Typically, fixed bed and fluidized bed reactors are used to contact the solids with reactants. However, in reactions where reaction residence time is low, tubular reactors are used to create plugged flow velocity profiles. Such profiles prevent backmixing of the reactants, and ensure uniform reaction radially along the length of the tubular reaction zone. Gradients normal to the flow of material through the tubes are undesirable because such temperature and concentration variations interfere with the yield and distribution profiles from the reaction.

An example of the use of solids as a heat supply medium is illustrated in the above mentioned U.S. Pat. No. 4,061,562 to McKinney et al which describes a TRC process to react residual petroleum oils to produce olefins, particularly ethylene. In this system the reaction proceeds axially along the length of the riser reactor, the temperature gradually decreasing as endothermic heat of reaction is withdrawn therefrom.

In each of the systems described above, as well as other systems requiring the continuous addition of particulate solids, the means of feeding the solids to the reaction zone should satisfy two criteria. First, the flow of solids must be regulated. Generally, the solids flow rate is adjusted to reestablish the set point of a controlled parameter, such as temperature, pressure, density, concentration of a particular product in the effluent, and the like. In conventional thermal cracking processes, for example, it is common to control furnace coil outlet temperature to +/− 10° F. This is equivalent to a +/− 2% variation in the heat input. Thus, McKinney's process would require control of the solids feed rate to approximately +/− 2%. The requirements for control of the flow rate of solids is influenced by the reaction time. For reaction times of less than one second, flow must be stable on a micro second level since the reaction times are less than the typical response times of conventional control means i.e., valves, etc.

Second, the solids feeding device should allow rapid and complete mixing of the solids and fluid phases. This is especially true where reaction residence times are low, as in thermal cracking. If mixing takes an appreciable percentage of the reactor residence time, concentration and temperature gradiants normal to the flow of material passing through the early stages of the reaction zone will create variations in reaction rate. Hence, product yields and distribution will be affected adversely. The present invention is an apparatus and a method for effecting flow control and uniform mixing of a particulate solids stream when introduced into a fluid stream.

Heretofore solids flow rate has been regulated in several ways using pneumatic or mechanical means. One method and system for facilitating the delivery of particulate solds to a reactor is to fluidize the entire bed of solids in the chamber feeding solids to the reactor. This system is attended by the use of valves and other regulation means to regulate the gas pressure above the bed.

However, fluidized beds characteristically have poor control over bed height so that control of the flow through the orifice is similarly poor. The bed has fluid characteristics and the fluctuations in bed height, bed density, and overhead pressure are transmitted uniformly throughout the fluidized bed essentially instantaneously. Hence, the pressure above the orifice constantly varies, and the resultant variations in orifice pressure differential cannot be compensated for because recovery time is often too long. Thus, variations in solids flow to the reaction zone is inherent in this flow control system.

A second method used to deliver solids to a tubular reactor relies on pneumatic transport gas injected into a lift leg located between the reservoir and the reactor. By varying the transport gas flow rate to the lift leg, the density of material in the lift leg is regulated therby controlling the back pressure through the orifice which provides communication between the lift leg and the reservoir. This sytem has the disadvantage of generating gas bubbles in the lift leg which produces fluctuations in the solids flowrate.

Control is further compromised in this system because the high rate of aeration gas necessary to transport the solids is a negative influence on the rapid and uniform mixing of the solids and feed streams in the mixing zone at the top section of the reactor. In addition, large quantities of transport gas entering the reactor necessitate the use of over-sized reaction chambers to accommodate the inert aeration gas medium.

The third method employs mechanical valves to physically alter solids flowrate. Generally, valves are single or double disk types, the latter being preferred where uniformity of mixing is desirable. However, there is considerable erosion of the valve seat by the solids in each of these valves. These valves, therefore, must be replaced frequently, and have other maintenance problems associated with sealing the valves and properly maintaining and ascertaining the variable response that occurs as the valve seat erodes.

None of these three methods is particularly compatible with the operation necessary for the rapid and uniform mixing of the phases in low residence time reaction systems. Indeed, in order to feed solids to a TRC ethylene reactor, as noted above, the flow must be controlled to within ±2 percent or cracking severity oscillations will be greater than that presently experienced in coil cracking. The solids feed device (local fluidization) of the subject invention minimizes bed height as a variable and dampens the effect of over bed pressure fluctuations, both of which contribute to flow fluctuations. It is thus uniquely suited to short residence time reactions, especially on the order of 0.05 to 2 seconds, as in the above mentioned TRC systems.

Further, for short residence time reactions, the rapid and intimate mixing are critical in obtaining good selectivity (minimize mixing time as a percentage of total reacting time).

Both of the above mentioned features permit the TRC to move to shorter residence times which increase selectivity. Conventional fluid bed feeding devices are adequate for longer time and lower temperature reactions (FCC) especially catalytic ones where minimal reaction occurs if the solids are not contacting the gas (poor mixing).

SUMMARY OF INVENTION

It is an object of the present invention to regulate the rate of solids added continuously to a solids-fluid reaction system of the TRC type, the solids participating in the reaction as a reactant, catalyst, or inert heat supply medium.

It is a further object of the invention to provide a method and apparatus for the regulation of solids flow to the solids-fluid reaction equipment.

It is also an object of the invention to provide an apparatus to regulate the flow of solids to said reaction system, which has no movable parts, and therefore, is less subject to rapid erosion by the solids.

It is an additional object of the apparatus of this invention to mix rapidly and uniformly the required flow of solids with the fluid reactants in the reaction zone.

A further aspect of this invention is to afford an apparatus and system to regulate the continuous flow of solids to the reaction zone and to mix said solids rapidly and uniformly with other components introduced simultaneously therein to produce a homogeneous reacting phase.

These and other advantages and objects of the present invention will be analyzed below.

The present invention is an apparatus and method for continuously feeding particulate solids to a TRC reaction chamber or zone at a controlled rate of flow, and for admixing the solids with fluid simultaneously introduced to the reaction zone. This invention utilizes one or more conduits, preferably tubular, to transfer the solids from a solids reservoir chamber to the reaction chamber at a controlled rate of flow, said conduits being in open communication with both the reservoir chamber and with the reaction chamber. The conduits are in the nature of orifices, and are symmetrically located across the reactor cross section, said orifices or conduits also being specially oriented with respect to the fluid reactant inlet to promote rapid and intimate mixing of the two phases. The fluid reactants are added to the reaction system preferably through an annular orifice surrounding each tubular conduit. Preferably, these reactants are introduced angularly to the flow of solids such that the projection of the reactant flow path forms a cone, the vertex of which is below the conduit outlet. While an annular orifice is preferred, it is not inconsistent with the system to utilize in lieu of the annular orifice, a multiplicity of inlet tubes spaced at equal intervals around the conduit. By adding the solids and the reactant fluid in this manner very rapid mixing is achieved.

Mixing is enhanced by the use of a plurality of tubular conduits each conduit being surrounded by an annular orifice for gas flow. This occurs because the use of multiple tubular conduits greatly increases the shear surface/flow area ratio, which is an important criterion for good mixing. Perfect mixing is obtained when this ratio is infinite.

Mixing is further increased by reducing flow area by means of plugs extending into the region of mixing within the reaction chamber.

It is desirable to regulate the flow in this system to below +/− 5%, preferably below +/− 2%. To achieve this close control on solids flow rate, the dampening characteristics of a non-fluidized bed are employed simultaneously with the flow relationships which are inherent with fluidized bed control systems previously discussed. The essential feature of the control system is the localized fluidization of the solids just above the conduit inlet. In no instance is the amount of fluidization gas sufficient to fluidize the entire bed of solids in the reservoir. Rather, the amount of gas added is sufficient to only locally fluidize those solids in the region of the conduit inlet.

Fluidized bed solids generally flow through an orifice or conduit subject to the function:

$$G_s = f(\Delta P_{orifice})^{\frac{1}{2}}, \text{ where } \Delta P_{orifice} \text{ is equal to } P_{bed} + @bed\ h_{bed} - P_{reactor}.$$

As a result the conventional fluidized systems depend on controlling the system pressure, the density of the bed and the height of the bed to achieve good solids flow control. These conventional systems therefore are difficult to control. The present apparatus and process eliminates the bed density as a major factor and minimizes the bed height as a factor.

DESCRIPTION OF PREFERRED EMBODIMENT

Figure 2:
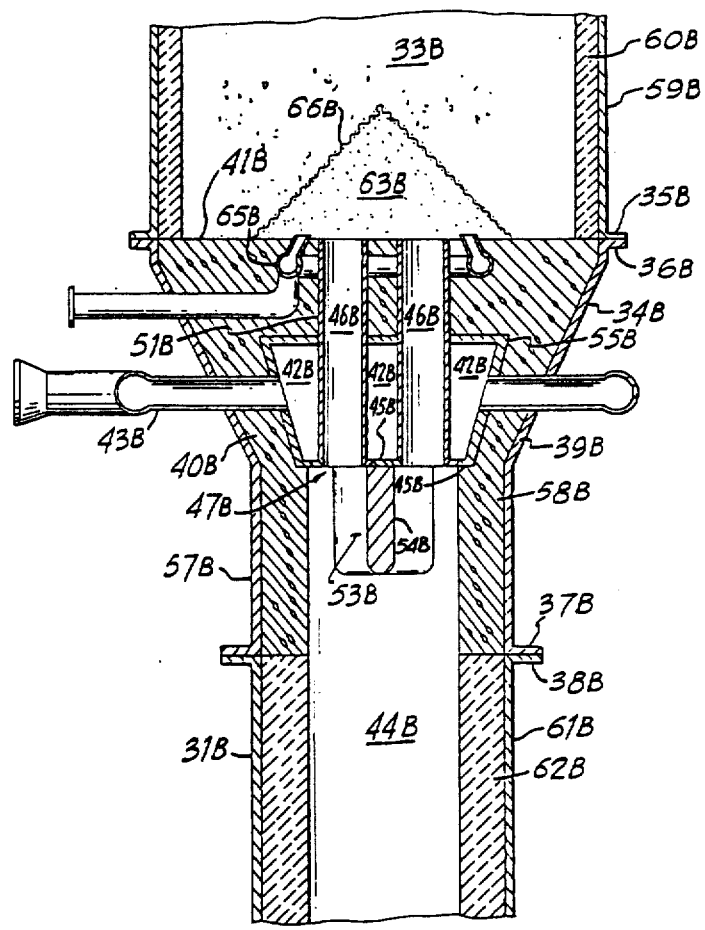
FIG. 2 is a cross sectional elevational view of the preferred embodiment of the invention as applied to tubular reactors and for use with gaseous feeds.

In FIG. 2, the preferred embodiment of the invention is shown installed for use with a tubular or plug flow reactor 31B, although the invention is particularly suitable for use as embodied in a TRC apparatus as disclosed in the above mentioned U.S. Pat. Nos. 4,061,562 and 4,097,363, the disclosures of which are incorporated herein by reference.

Figure 1:
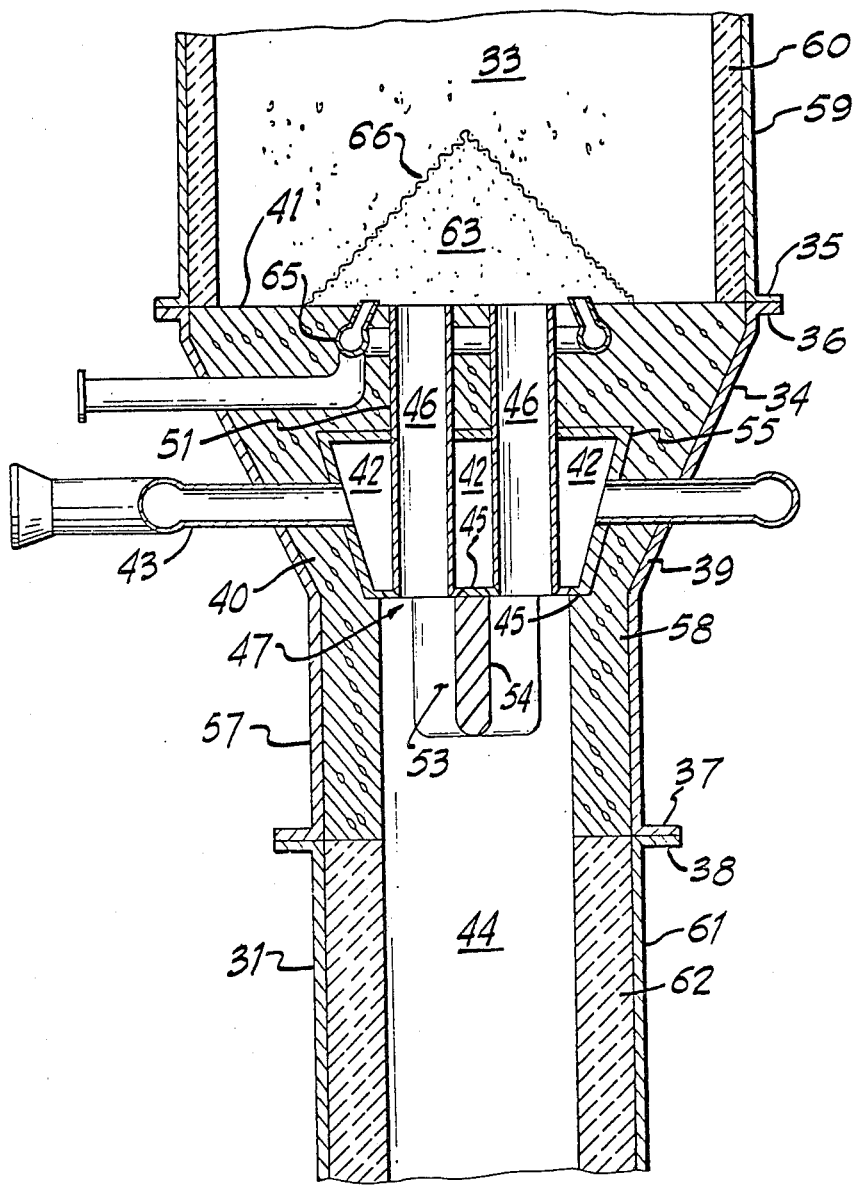
FIG. 1 is a schematic diagram of a TRC system and process according to the prior art.

Referring to FIG. 1, in the piror art TRC process and system, thermal cracker feed oil or residual oil, with or without blended distillate heavy gas, entering through line 10 and hydrogen entering through line 12 pass through hydrodesulfurized zone 14. Hydrosulfurization effluent passes through line 16 and enters flash chamber 18 from which hydrogen and contaminating gases including hydrogen sulfide and ammonia are removed overhead through line 20, while flash liquid is removed through line 22. The flash liquid passes through preheater 24, is admixed with dilution steam entering through line 26 and then flows to the bottom of thermal cracking reactor 28 through line 30.

A stream of hot regenerated solids is charged through line 32 and admixed with steam or other fluidizing gas entering through line 34 prior to entering the bottom of riser 28. The oil, steam and hot solids pass in entrained flow upwardly through riser 28 and are discharged through a curved segment 36 at the top of the riser to induce centrifugal separation of solids from the effluent stream. A stream containing most of the solids passes through riser discharge segment 38 and can be mixed, if desired, with make-up solids entering through line 40 before or after entering solids separator-stripper 42. Another stream containing most of the cracked product is discharged axially through conduit 44 and can be cooled by means of a quench stream entering through line 46 in advance of solids separator-stripper 48.

Stripper steam is charged to solids separators 42 and 48 through lines 50 and 52, respectively. Product streams are removed from solids separators 42 and 48 through lines 54 and 56, respectively, and them combined in line 58 for passage to a secondary quench and product recovery train, not shown. Coke-laden solids are removed from solids separators 42 and 48 through lines 60 and 62, respectively, and combined in line 64 for passage to burner 66. If required, torch oil can be added to burner 66 through line 68 while stripping steam may be added through line 70 to strip combustion gases from the heated solids. Air is charged to the burner through line 69. Combustion gases are removed from the burner through line 72 for passage to heat and energy recovery systems, not shown, while regenerated hot solids which are relatively free of coke are removed from the burner through line 32 for recycle to riser 28. In order to produce a cracked product containing ethylene and molecular hydrogen, petroleum residual oil is passed through the catalytic hydrodesulfurization zone in the presence of hydrogen at a temperature between 650° F. and 900° F., with the hydrogen being chemically combined with the oil during the hydrocycling step. The hydrosulfurization residual oil passes through the thermal cracking zone together with the entrained inert hot solids functioning as the heat source and a diluent gas at a temperature between about 1300° F. and 2500° F. for a residual time between about 0.05 to 2 seconds to produce the cracked product and ethylene and hydrogen. For the production of ethylene by thermally cracking a hydrogen feed at least 90 volume percent of which comprises light gas oil fraction of a crude oil boiling between 400° F. and 650° F., the hydrocarbon feed, along with diulent gas and entrained inert hot gases are passed through the cracking zone at a temperature between 1300° F. and 2500° F. for a residence time of 0.05 to 2 seconds. The weight ratio of oil gas to fuel oil is at least 0.3, while the cracking severity corresponds to a methane yield of at least 12 weight percent based on said feed oil. Quench cooling of the product immediately upon leaving the cracked zone to a temperature below 1300° F. ensures that the ethylene yield is greater than the methane yield on a weight basis.

Again referring to FIG. 2, in lieu of the system of the prior art (see FIG. 1) wherein the stream of solids plus fluidizing gas contact the flash liquid-dilution steam mixture entering reactor 28, structurally the apparatus 32B of the subject invention comprises a solids reservoir vessel 33B and a housing 34B for the internal elements described below. The housing 34B is conically shaped in the embodiment of FIG. 2 and serves as a transition spool piece between the reservoir 33B and the reactor 32B to which it is flageably connected via flanges 35B, 36B, 37B and 38B. The particular geometry of the housing is functional rather than critical. The housing is itself comprised of an outer metallic shell 39B, preferably of steel, and an inner core 40B of a castable ceramic material. It is convenient that the material of the core 40B forms the base 41B of the reservoir 33B.

Set into and supported by the inner core 40B is a gas distribution chamber 42B, said chamber being supplied with gaseous feed from a header 43B. While the chamber 42B may be of unitary construction, it is preferred that the base separating the chamber 42B from reaction zone 44B be a removable plate 45B. One or more conduits 46B extend downwardly from the reservoir 33B to the reaction zone 44B, passing through the base 41B, and the chamber 42B. The conduits 46B are in open communication with both the reservoir 33B and the reaction zone 44B providing thereby a path for the flow of solids from the reservoir 33B to the reaction zone 44B. The conduits 46B are supported by the material of the core 40B, and terminate coplanarly with a plate 45B, which has apertures 47B to receive the conduits 46B. The region immediately below the plate 45B is hereinafter referred to as a mixing zone 53B which is also part of the reaction zone 44.

Figure 3:
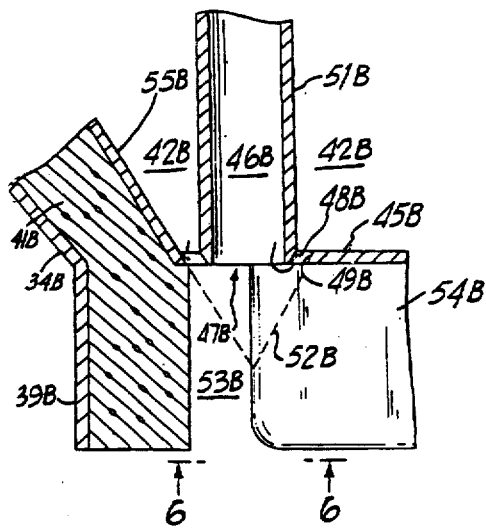
FIG. 3 is an enlarged view of the intersection of the solid and gas phases within the mixing zone of the reaction chamber.

As shown in FIG. 3, an enlarged partial view of the intersection of the conduit 46B and the plate 45B, the apertures 47B are larger than the outside dimension of conduits 46B, forming therebetween annular orifices 48B for the passage of gaseous feed from the chamber 42B. Edges 49B of the apertures 47B are preferably convergently beveled, as are the edges 50B, at the tip of the conduit wall 51B. In this way the gaseous stream from the chamber 42B is angularly injected into the mixing zone 53B and intercepts the solids phase flowing from conduits 46B. A projection of the gas flow would form a cone shown by dotted lines 52B the vertex of which is beneath the flow path of the solids. By introducing the gas phase angularly, the two phases are mixed rapidly and uniformly, and form a homogeneous reaction phase. The mixing of a solid phase with a gaseous phase is a function of the shear surface between the solids and gas phases, and the flow area. A ratio of shear surface to flow area (S/A) of infinity defines perfect mixing; poorest mixing occurs when the solids are introduced at the wall of the reaction zone. In the system of the present invention, the gas stream is introduced annularly to the solids which ensures high shear surface. By also adding the gas phase transversely through an annular feed means, as in the preferred embodiment, penetration of the phases is obtained and even faster mixing results. By using a plurality of annular gas feed points and a plurality of solid feed conduits, even greater mixing is more rapidly promoted, since the surface to area ratio for a constant solids flow area is increased. Mixing is also a known function of the L/D of the mixing zone. A plug creates an effectively reduced diameter D in a constant L, thus increasing mixing.

The Plug 54B, which extends downwardly from plate 45B, as shown in FIGS. 2 and 3, reduces the flow area, and forms discrete mixing zones 53B. The combination of annular gas addition around each solids feed point and a confined discrete mixing zone greatly enhances the conditions for mixing. Using this preferred embodiment, the time required to obtain an essentially homogeneous reaction phase in the reaction zone 44B is quite low. Thus, this preferred method of gas and solids addition can be used in reaction systems having a residence time below 1 second, and even below 100 milliseconds. In such reactions the mixing step must be performed in a fraction of the total residence time, generally under 20% thereof. If this criteria is not achieved, localized and uncontrolled reaction occurs which deleteriously affects the product yield and distribution. This is caused by the maldistribution of solids normal to the flow through the reaction zone 44B thereby creating temperature and or concentration gradients therein.

Figure 4:
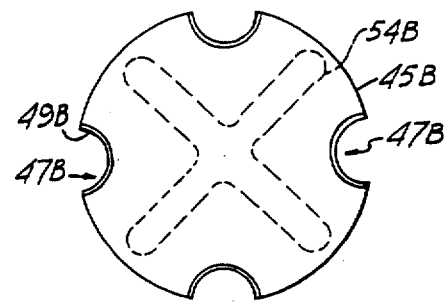
FIG. 4 is a top view of the preferred plate geometry, said plate serving as the base of the gas distribution chamber.
Figure 6:
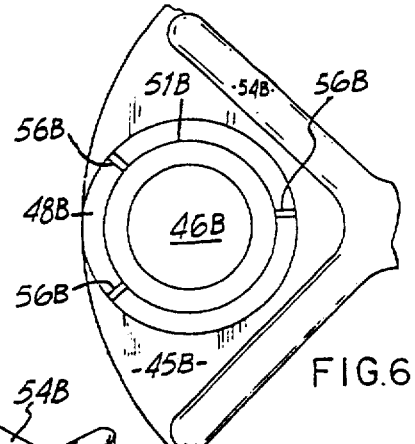
FIG. 6 is a view through line 6—6 of FIG. 3.
Figure 7:
FIG. 7 is an isometric view of the plug which extends into the mixing zone to reduce flow area.

The flow area is further reduced by placing the apertures 47B as close to the walls of the mixing zone 53B as possible. FIG. 4 shows the top view of plate 45B having incomplete circular apertures 47B symmetrically spaced along the circumference. The plug 54B, shown by the dotted lines and in FIG. 7, is below the plate, and establishes the discrete mixing zones 53B described above. In this embodiment, the apertures 47B are completed by the side walls 55B of gas distribution chamber 42B as shown in FIG. 3. In order to prevent movement of conduits 46B by vibration and to retain the uniform width of the annular orifices 48B, spacers 56B, are used as shown in FIG. 6. However, the conduits 46B are primarily supported within the housing 34B by the material of the core 40B as stated above.

Referring to FIG. 7, the plug 54B serves to reduce the flow area and define discrete mixing zones 53B. The plug 54B may also be convergently tapered so that there is a gradual increase in the flow area of the mixing zone 53B until the mixing zone merges with remainder of the reaction zone 44B. Alternatively, a plurality of plugs 54B can be used to obtain a mixing zone 53B of the desired geometric configuration.

Referring again to FIG. 2, the housing 34B may preferably contain a neck portion 57B with corresponding lining 58B of the castable ceramic material and a flange 37B to cooperate with a flange 38B on the reaction chamber 31B to mount the neck portion 57B. This neck portion 57B defines mixing zone 53B, and allows complete removal of the housing 34B without disassembly of the reactor 31B or the solids reservoir 33B. Thus, installation, removal and maintenance can be accomplished easily. Ceramic linings 60B and 62B on the reservoir 33B and the reactor walls 61B respectively are provided to prevent erosion.

The solids in reservoir 33B are not fluidized except solids 63B in the vicinity of conduits 46B. Aeration gas to locally fluidize the solids 63B is supplied by nozzles 64B symmetrically placed around the conduits 46B. Gas to nozzles 64B is supplied by a header 65B. Preferably, the header 65B is set within the castable material of the core 40B, but this is dependent on whether there is sufficient space in the housing 34B. A large mesh screen 66B is placed over the inlets of the conduit 64B to prevent debris and large particles from entering the reaction zone 44B or blocking the passage of the particulate solids through the conduits 46B.

By locally fluidizing the solids 63B, the solids 63B assume the characteristics of a fluid, and will flow through the conduits 46B. The conduits 46B have a fixed cross sectional area, and serve as orifices having a specific response to a change in orifice pressure drop. Generally, the flow of fluidized solids through an orifice is a function of the pressure drop through the orifice. That orifice pressure drop, in turn, is a function of bed height, bed density, and system pressure.

Figure 5:
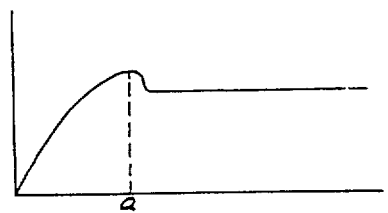
FIG. 5 is a graph of the relationship between bed density, pressure drop, bed height and aeration gas velocity in a fluidized bed.

However, in the process and apparatus of this invention the bulk of the solids in reservoir 33B are not fluidized. Thus, static pressure changes caused by variations in bed height are only slowly communicated to the inlet of the conduit 46B. Also the bed density remains approximately constant until the point of incipient fluidization is reached, that is, point "a" of FIG. 5. In the present invention, however, it is essential that the amount of aeration gas be below that amount. Any aeration gas flow above that at point "a" on FIG. 5 will effectively provide a fluidized bed and thereby lose the benefits of this invention. By adjustment of the aeration gas flow rate, the pressure drop across the non-fluidized bed can be varied. Accordingly, the pressure drop across the orifice is regulated and the flow of solids thereby regulated as shown in FIG. 5. As gas flow rates below incipient fluidization, significant pressure increases above the orifice can be obtained without fluidizing the bulk of the solids. Any effect which the bed height and the bed density variations have on mass flow are dampened considerably by the presence of the non-fluidized reservoir solids and are essentially eliminated as a significant factor. Further the control provided by this invention affords rapid response to changes in solids mass flow regardless of the cause.

Together with the rapid mixing features described above, the present invention offers an integrated system for feeding particulate solids to a reactor or vessel, especially to a TRC tubular reactor wherein very low reaction residence times are encountered.

Figure 9:
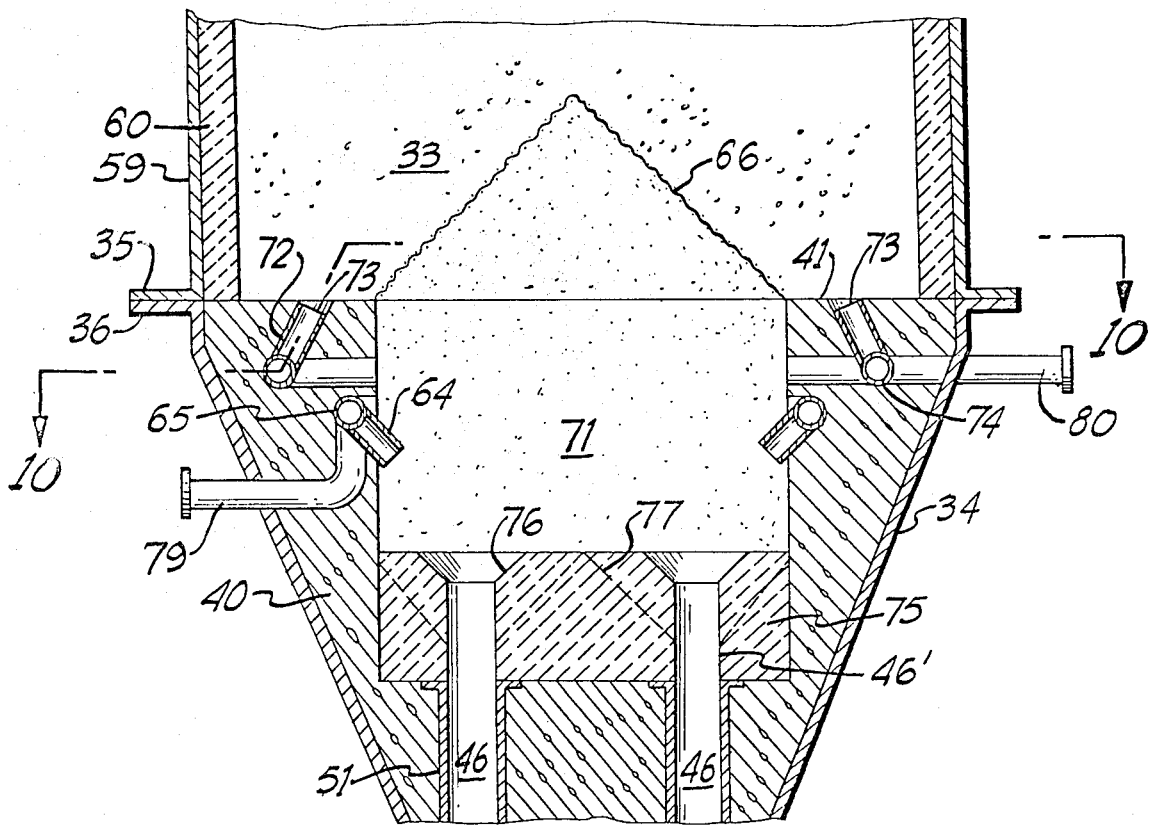
FIG. 9 is a view along line 9—9 of FIG. 8 showing the header and piping arrangements supplying aeration gas to the clean out and fluidization nozzles.
Figure 8:
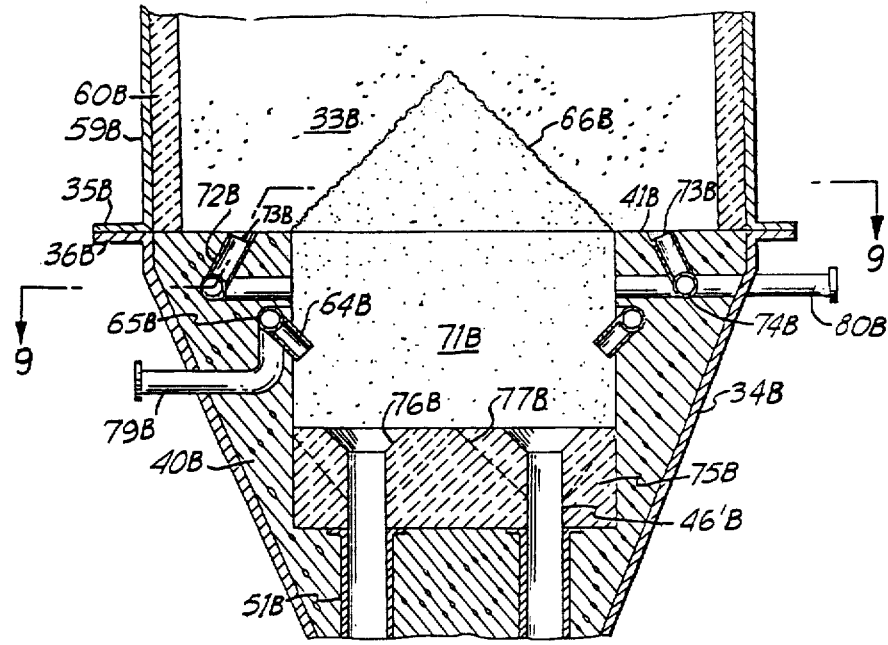
FIG. 8 is an alternate preferred embodiment of the control features of the present invention.
Figure 10:
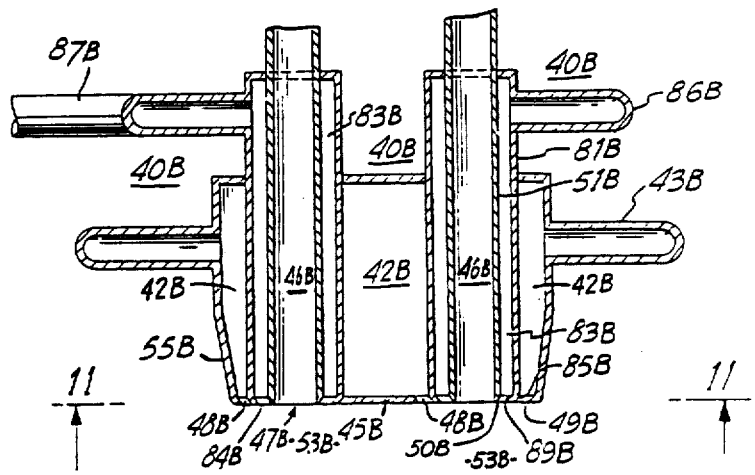
Figure 9:
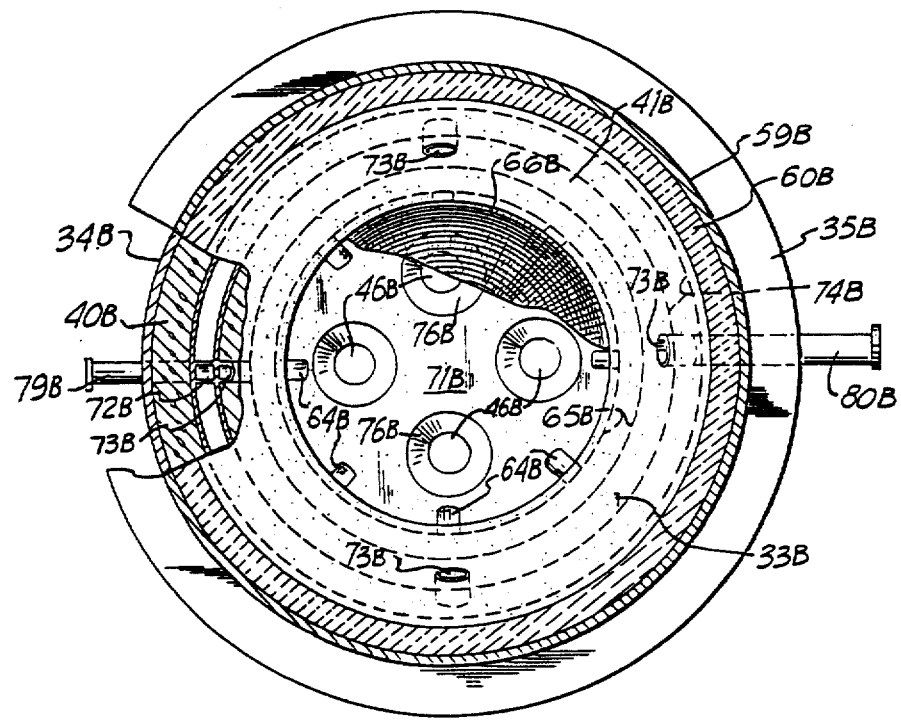
Figure 11:
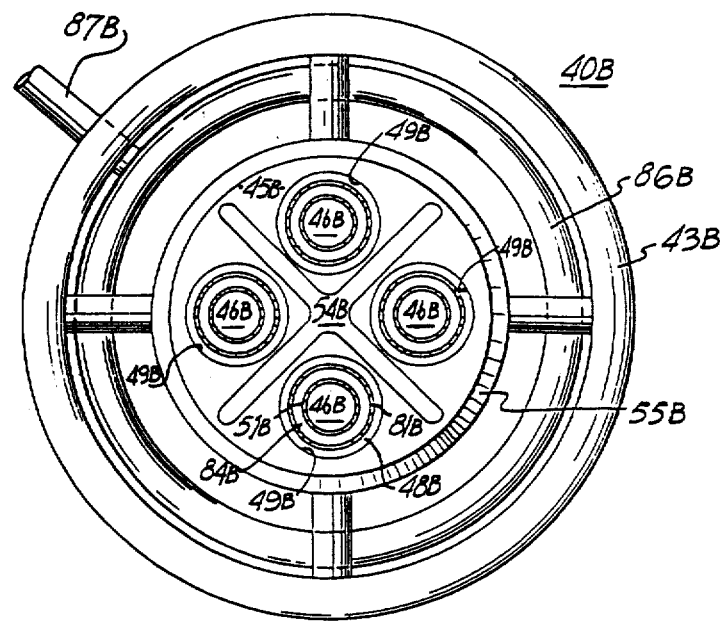

FIGS. 8 and 9 depict an alternate preferred embodiment of the control features of the present invention. In this embodiment the reservoir 33B extends downwardly into the core material 40B to form a secondary or control reservoir 71B. The screen 66B is positioned over the entire control reservoir 71B. The aeration nozzles 64B project downwardly to fluidize essentially these solids 63B beneath the screen 66B. The bottom 41B of the reservoir 33B is again preferably formed of the same material as the core 40B.

A plurality of clean out nozzles 72B are preferably provided to allow for an intermittent aeration gas discharge which removes debris and large particles that may have accumulated on the screen 66B. Porous stone filters 73B prevent solids from entering the nozzles 72B.

Headers 65B and 74B provide the gas supply to nozzles 64B and 72B respectively.

The conduits 46B communicate with the reservoir 71B through leading section 46'B. The leading sections 46'B are formed in a block 75B made of castable erosion resistent ceramic material such as Carborundum Alfrax 201. The block 75B is removable, and can be replaced if eroded. The entrance 75B to each section 46'B can be sloped to allow solids to enter more easily. In addition to being erosion resistent, the block 75B provides greater longevity because erosion may occur without loss of the preset response function. Thus, even if the conduit leading sections 46'B erode as depicted by dotted lines 77B, the remaining leading section 46'B will still provide a known orifice size and pressure drop response. The conduits 46B are completed as before using erosion resistent metal tubes 51B, said tubes being set into core material 40B and affixed to the block 75B.

FIG. 9 is a plan view of FIG. 8 along section 9—9 showing an arrangement for the nozzles 64B and 72B, and the headers 65B and 74B. Gas is supplied to the headers 65B and 74B through feed lines 79B and 80B respectively, which extend out beyond the shell 34B. It is not necessary that the headers be set into the material of the core 40B, although this is a convenience from the fabrication standpoint. Uniform flow distribution to each of the nozzles is ensured by the hydraulics of the nozzles themselves, and does not require other devices such as an orifice or venturi. The gas supplied to feed lines 79B and 80B is regulated via valve means not shown.

Figure 11:
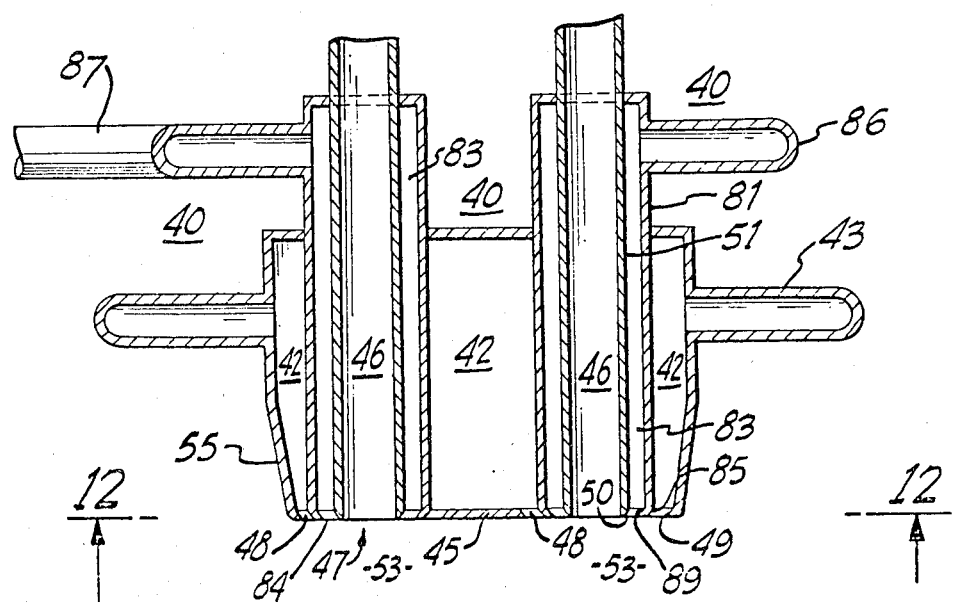
FIG. 11 is a view of the apparatus of FIG. 10 through line 11—11 of FIG. 10.
Figure 10:
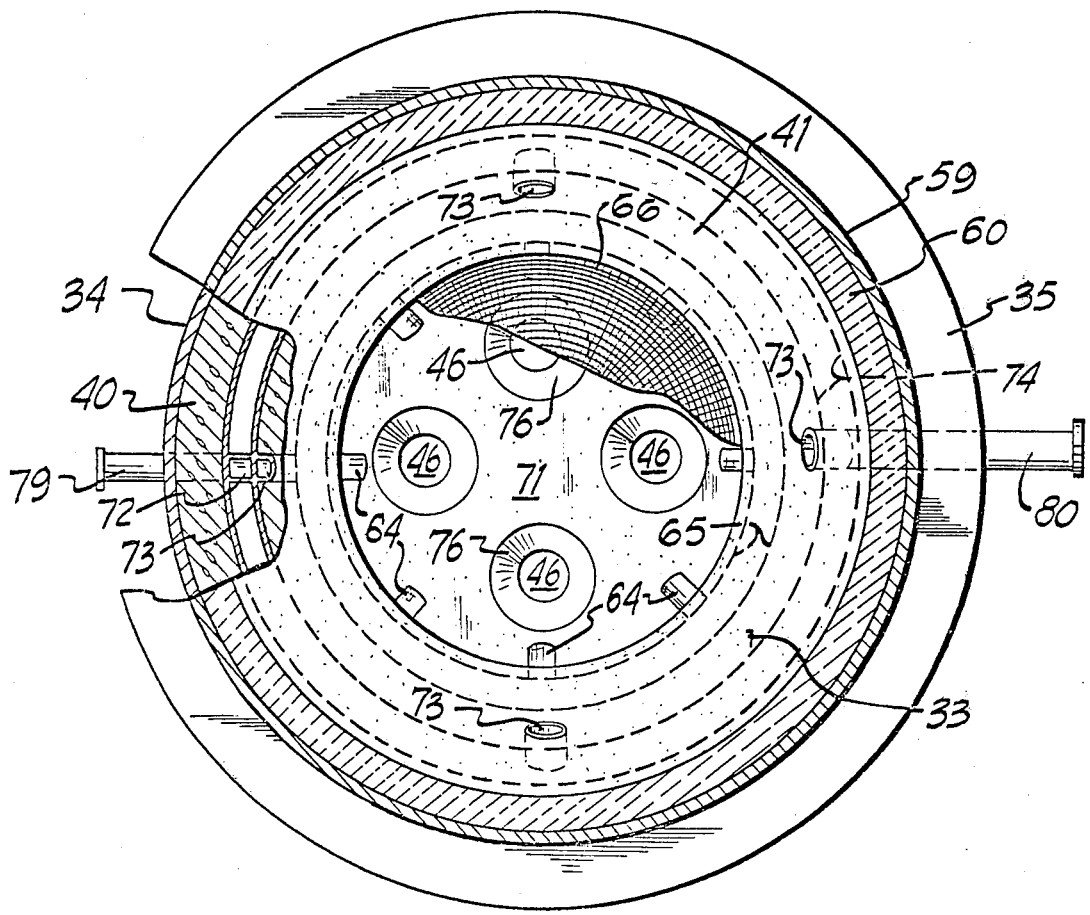
FIG. 10 is an alternate embodiment of the preferred invention wherein a second feed gas is contemplated.
Figure 12:
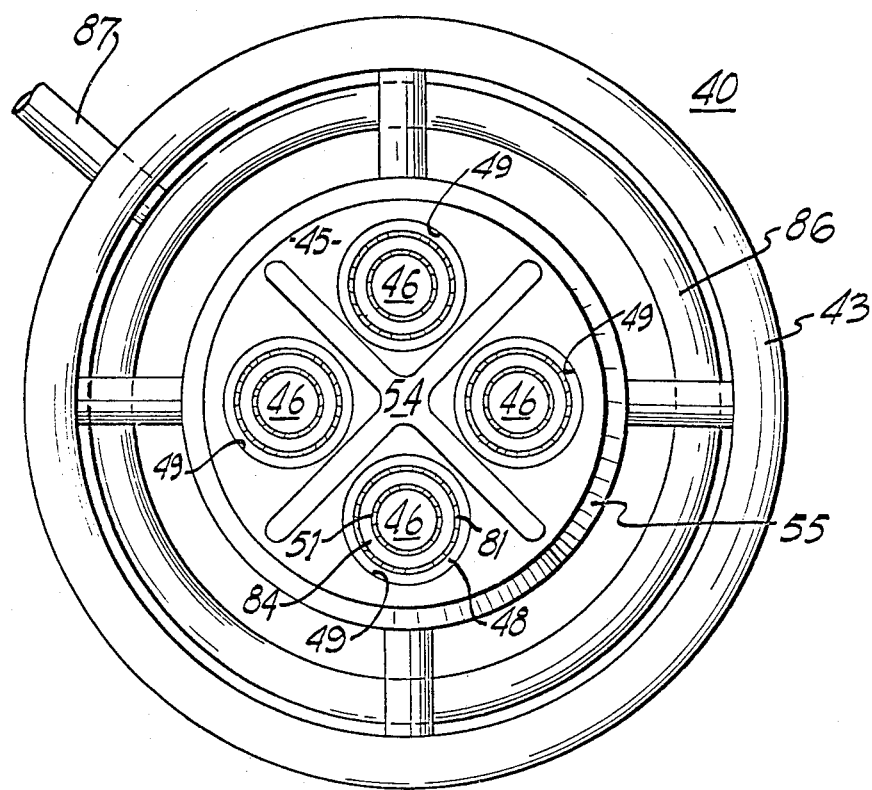
Figure 13:
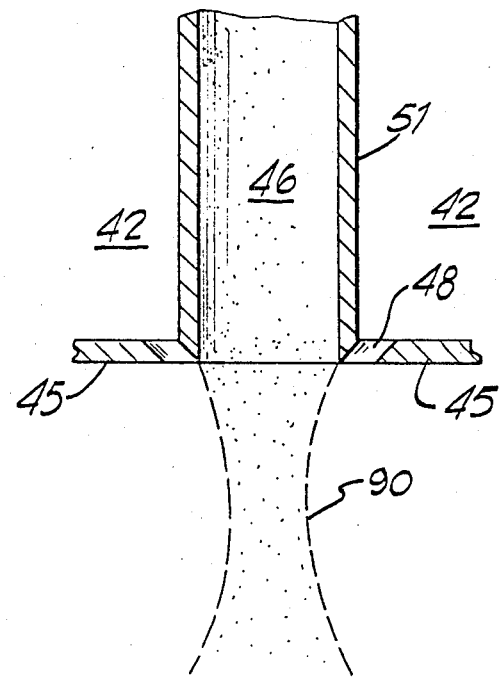
Figure 14:
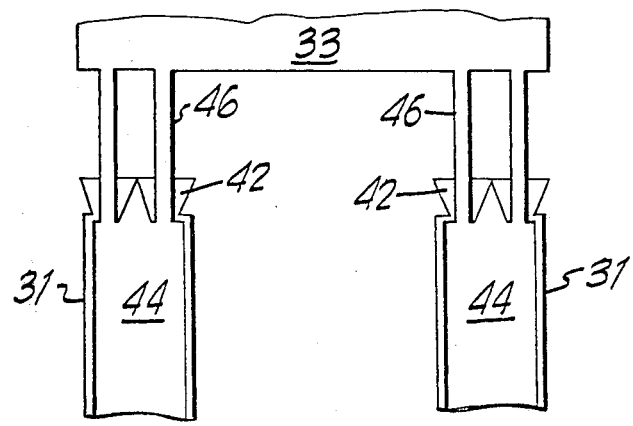
Figure 15:
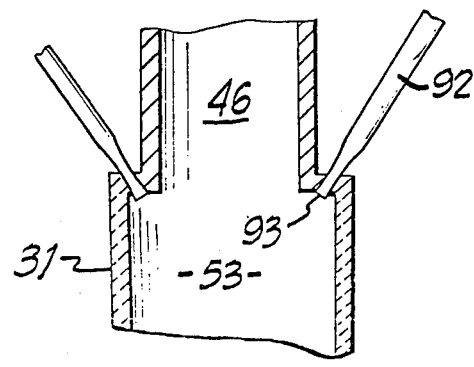
Figure 1:
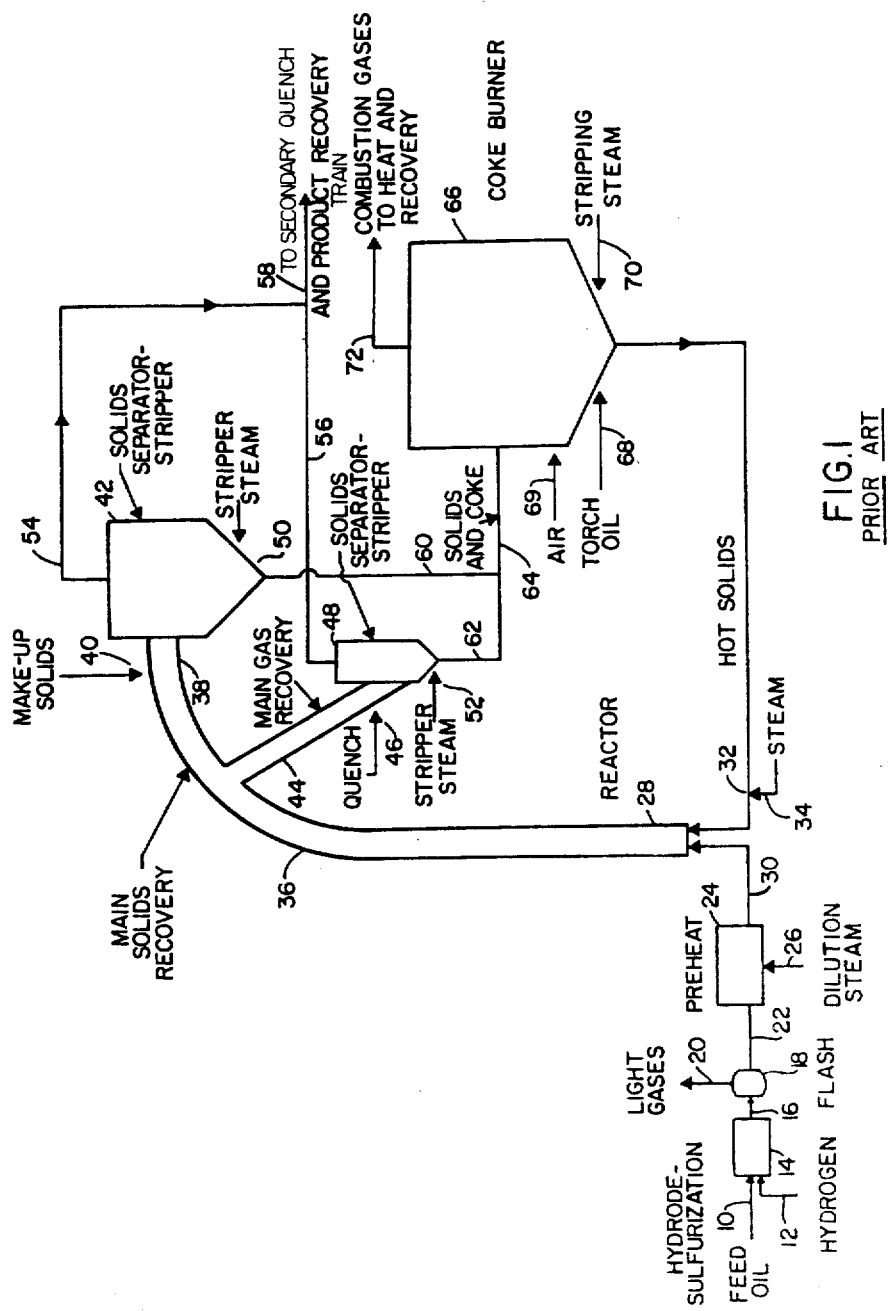

FIGS. 10 and 11 show the pertinent parts of an alternate embodiment of the invention wherein a second gas distribution assembly for feed gas is contemplated. As in the other embodiments, a gas distribution chamber 42B terminating in annular orifice 48B surrounds each solids delivery conduit 46B. However, rather than a common wall between the chamber 47B and the conduit 46B, a second annulus 83B is formed between the chamber 42B and the conduit 46B. Walls 81B and 51B define the chambers 83B. Feed is introduced through both the annular opening 48B in the chamber 42B and the annular opening 84B in the annulus 83B at an angle to the flow of solids from the conduits 46B. The angular entry of the feed gas to the mixing zone 53B is provided by beveled walls 49B and 85B, which define the openings 48B and beveled walls 50B and 89B which define the openings 84B. Gas is introduced to the annulus 83B through the header 86B, the header being set into the core 40B if convenient.

FIG. 11 is a plan view of the apparatus of FIG. 10 through section 11—11 showing the conduit openings and the annular feed openings 48B and 84B. Gas is supplied through feed lines 87B and 88B to the headers 43B and 86B and ultimately to the mixing zones through the annular openings. Uniform flow from the chambers 42B and 83B is ensured by the annular orifices 48B and 84B. Therefore, it is not essential that flow distribution means such as venturis or orifices be included in the header 43B. The plug 54B is shaped symmetrically to define discrete mixing zones 53B.

Mixing efficiency is also dependent upon the velocities of the gas and solid phases. The solids flow through the conduits 46B in dense phase flow at mass velocities from preferably 200 to 500 pounds/sq. ft./sec, although mass veocities between 50 and 1000 pounds/sq. ft./sec., may be used depending on the characteristics of the solids used. The flow pattern of the solids in the absence of gas is a slowly diverging cone. With the introduction of the gas phase through the annular orifices 48B at velocities between 30 and 800 ft./sec., the solids develop a hyperbolic flow pattern which has a high degree of shear surface. Preferably, the gas velocity through the orifices 48B is between 125 and 250 ft./sec. Higher velocities are not preferred because erosion is accelerated; lower velocities are not preferred because the hyperbolic shear surface is less developed.

The initial superficial velocity of the two phases in the mixing zone 53B is preferably about 20 to 80 ft./sec., although this velocity changes rapidly in many reaction systems, such as thermal cracking, as the gaseous reaction products are formed. The actual average velocity through the mixing zone 53B and the reaction zone 44B is a process consideration, the velocity being a function of the allowed residence time therethrough.

By employing the solid feed device and method of the present inventions, the mixing length to diameter ratio necessary to intimately mix the two phases is greatly reduced. This ratio is used as an informal criteria which defines good mixing. Generally, an L/D(length/dia.) ratio of from 10 to 40 is required. Using the device disclosed herein, this ratio is less than 5, with ratios less than 1.0 being possible. Well designed mixing devices of the present invention may even achieve essentially complete mixing at L/D ratios less than 0.5.

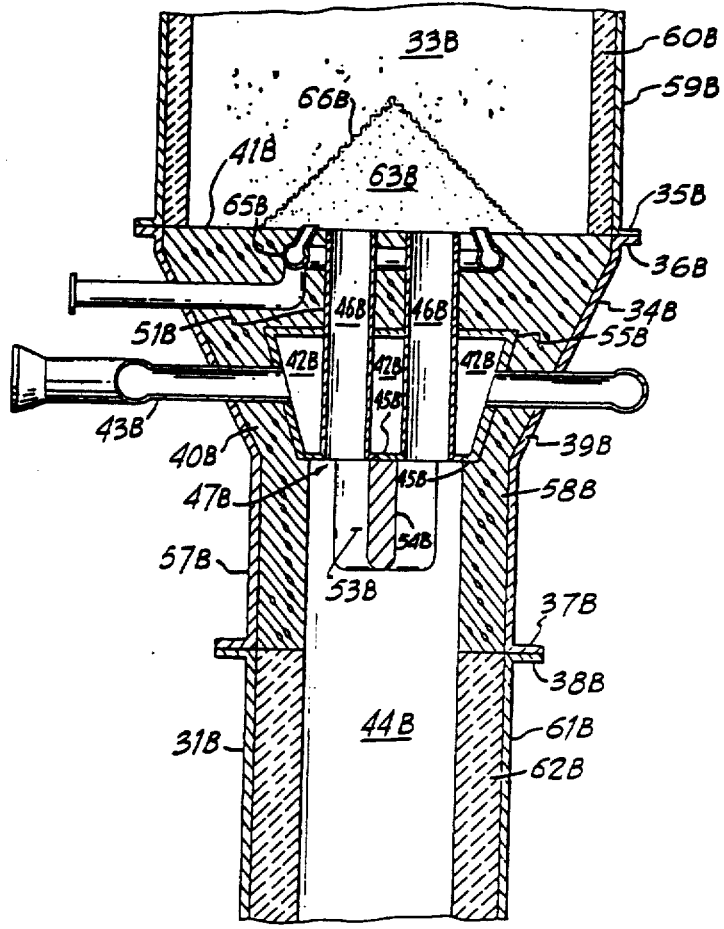

I claim:

1. In a TRC apparatus having a tubular thermal cracking reactor, means for delivering hot inert particulate solids to the reactor and means for delivering hydrocarbon feed or hydrodesulfurized residual oil fluid feed to the reactor and wherein the temperature in the reaction chamber cracking zone is between 1300° and 2500° F. and wherein the hydrocarbon fluid feed or the hydrosulfurization residual oil fluid feed along with the entrained inert particulate solids and the diluent gas are passed through the cracking zone for a residence time of 0.05 to 2 seconds, the improvement comprising an apparatus for continuously feeding a regulated flow of particulate solids to the reaction chamber and for admixing the solids rapidly and intimately with the fluid feed introduced simultaneously thereto comprising:
   a. an upper reservoir containing the particulate solids;
   b. a conduit extending downwardly from the reservoir to the reaction chamber, said conduit being in open communication with the reservoir and the reaction chamber;
   c. means for introducing a quantity of aeration gas to the upper reservoir in the vicinity above the conduit, to locally fluidize the solids proximate to the conduit causing said locally fluidized solids and a portion of the aeration gas to flow through the conduit; and
   d. means for introducing the fluid feed to the reaction chamber angularly to the flow of solids such that the projected flow of feed intercepts the discharge flow of solids leaving the conduit.

2. In a TRC apparatus having a tubular thermal cracking reactor, means for delivering hot inert particulate solids to the reactor and means for delivering hydrocarbon feed or hydrodesulfurized residual oil fluid feed to the reactor and wherein the temperature in the reaction chamber cracking zone is between 1300° and 2500° F. and wherein the hydrocarbon fluid feed or the hydrosulfurization residual oil fluid feed along with the entrained inert particulate solids and the diluent gas are passed through the cracking zone for a residence time of 0.05 to 2 seconds, the improvement comprising an apparatus for continuously feeding a regulated flow of particulate solids to the reaction chamber and for admixing the solids rapidly and intimately with the fluid feed introduced simultaneously thereto comprising:
  a. an upper reservoir containing the particulate solids;
  b. a plurality of conduits extending downwardly from the reservoir to the reaction chamber, said conduits being in open communication with the reservoir and the reaction chamber;
  c. a plurality of aeration nozzles spaced symmetrically around the inlets of said conduits for introducing a quantity of aeration gas to the upper reservoir in the vicinity above the conduit, to locally fluidize the solids proximate to each conduit causing locally fluidized solids and a portion of the aeration gas to flow through the conduit;
  d. a header to supply aeration gas to the aeration nozzles;
  e. annular orifices around each conduit;
  f. a gaseous feed distribution chamber located above the reaction chamber, surrounding the conduits and in communication with the reaction chamber through the annular orifies, said distribution chamber having a base coplanar with the openings of the conduits facing the reaction chamber said base of the distribution chamber having holes therein, the holes surrounding the conduits and being larger than the outside dimension of the conduits to form the annular orifices;
  g. a header for supplying feed to the distribution chamber;
  h. a mixing zone for the gaseous and solids feed in the reactor in open communication with the conduits; and
  i. a plug extending downwardly from the base of the distribution chamber into the mixing zone to form discrete mixing zone sections.

3. The apparatus of claim 1 wherein the means for introducing aeration gas is a plurality of nozzles spaced symmetrically around the inlets of said conduits.

4. The apparatus of claim 2 wherein the base of the distribution chamber is a removable plate having holes larger than the outer dimesion of and receiving the conduits, said conduits having convergently beveled outside walls at the outlet end which terminate coplanarly with said plate and within the holes forming thereby the annular orifices, the holes further having convergently beveled edges whereby the direction of gas flow is angled toward the conduit outlet, the projection of which forms a cone the vertex of which is beneath said conduit outlet.

5. In a TRC apparatus having a tubular thermal cracking reactor, means for delivering hot inert particulate solids to the reactor and means for delivering hydrocarbon feed or hydrodesulfurized residual oil fluid feed to the reactor and wherein the temperature in the reaction chamber cracking zone is between 1300° and 2500° F. and wherein the hydrocarbon fluid feed or the hydrosulfurization residual oil fluid feed along with the entrained inert particulate solids and the diluent gas are passed through the cracking zone for a residence time of 0.05 to 2 seconds, the improvement comprising an apparatus for continuously feeding a regulated flow of particulate solids to the reaction chamber and for admixing the solids rapidly and intimately with the fluid feed introduced simultaneously thereto comprising:
  a. an upper reservoir containing the particulate solids;
  b. a conduit extending downwardly from the reservoir to the reaction chamber, said conduit being in open communication with the reservoir and reaction chamber; and
  c. a plurality of aeration nozzles spaced symmetrically around the inlets of said conduits for introducing a quantity of the aeration gas to the upper reservoir in the vicinity above the conduit, to locally fluidize the solids proximate to the conduit causing said locally fluidized solids and a portion of the aeration gas to flow through the conduit.

6. The apparatus as in claim 5 further comprising a plurality of conduits extending between the upper reservoir and the reaction chamber.

7. An apparatus as in claim 5 further comprising a screen located above the conduit entry area.

8. An apparatus as in claim 5 further comprising means for periodically removing debris and large particles from the area in proximity to the aeration nozzles.

9. An apparatus as in claim 8 wherein the means for periodically removing debris and large particles from the area in proximity to the aeration nozzles are clean-out nozzles.

* * * * *

UNITED STATES PATENT AND TRADEMARK OFFICE
CERTIFICATE OF CORRECTION

PATENT NO. : 4,390,502

DATED : June 28, 1983

INVENTOR(S) : Robert J. Gartside and Herman N. Woebcke

It is certified that error appears in the above-identified patent and that said Letters Patent is hereby corrected as shown below:

The title page should be deleted to appear as per attached title page.

The sheets of drawings containing Figures 1-11 should be deleted to appear as per the attached sheets.

Signed and Sealed this

Twelfth Day of June 1984

[SEAL]

Attest:

GERALD J. MOSSINGHOFF

Attesting Officer

Commissioner of Patents and Trademarks

United States Patent [19]  
Gartside et al.

[11] 4,390,502  
[45] Jun. 28, 1983

[54] SOLIDS FEEDING DEVICE AND SYSTEM

[75] Inventors: Robert J. Gartside, Auburndale, Mass.; Herman N. Woebcke, Stamford, Conn.

[73] Assignee: Stone & Webster Engineering Corporation, Boston, Mass.

[21] Appl. No.: 318,926

[22] Filed: Nov. 6, 1981

Related U.S. Application Data

[63] Continuation of Ser. No. 165,786, Jul. 3, 1981, Pat. No. 4,352,728, which is a continuation-in-part of Ser. No. 89,951, Oct. 22, 1979, Pat. No. 4,338,187.

[51] Int. Cl.³ .................................................. F27B 15/08
[52] U.S. Cl. .................................... 422/145; 208/152; 208/153; 422/219
[58] Field of Search ............... 208/152, 153; 422/145, 422/219

[56] References Cited

U.S. PATENT DOCUMENTS

| | | | |
|---|---|---|---|
| 2,327,175 | 8/1943 | Conn | 422/219 X |
| 2,518,842 | 8/1950 | Weber | 23/284 |
| 2,905,634 | 9/1959 | MacLaren et al. | 208/149 |
| 3,121,593 | 2/1964 | McIlvaine | 302/53 |
| 3,136,705 | 6/1964 | Sommers | 202/14 |
| 3,573,200 | 3/1971 | Vogel | 208/173 |
| 3,733,011 | 5/1973 | Driscoll | 222/193 |
| 3,826,738 | 7/1974 | Zenz | 208/153 |
| 4,061,562 | 12/1977 | McKinney et al. | 208/61 |
| 4,097,362 | 6/1978 | McKinney | 208/78 |

Primary Examiner—Robert L. Lindsay, Jr.  
Attorney, Agent, or Firm—Hedman, Casella, Gibson & Costigan

[57] ABSTRACT

The present invention is an apparatus continuously feeding particulate solids to a TRC reaction chamber or zone at a controlled rate of flow, and for admixing the solids with fluid simultaneously introduced to the reaction zone. This invention utilized one or more conduits, preferably tubular, to transfer the solids from a solids reservoir chamber to the reaction chamber at a controlled rate of flow, the conduits being in open communication with both the reservoir chamber and with the reaction chamber. The conduits are in the nature of orifices, and are symmetrically located across the reactor cross section, said orifices or conduits also being specially oriented with respect to the fluid reactant inlet to promote rapid and intimate mixing of the two phases.

9 Claims, 11 Drawing Figures